(12) United States Patent
Zhao

(10) Patent No.: US 11,176,673 B2
(45) Date of Patent: Nov. 16, 2021

(54) METHOD AND DEVICE FOR ACQUIRING FIGURE PARAMETERS OF A USER

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Gang Zhao, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 135 days.

(21) Appl. No.: 16/479,300

(22) PCT Filed: Jan. 8, 2018

(86) PCT No.: PCT/CN2018/071761
§ 371 (c)(1),
(2) Date: Jul. 19, 2019

(87) PCT Pub. No.: WO2018/133691
PCT Pub. Date: Jul. 26, 2018

(65) Prior Publication Data
US 2019/0378277 A1    Dec. 12, 2019

(30) Foreign Application Priority Data

Jan. 22, 2017   (CN) .......................... 201710045890.1

(51) Int. Cl.
*G06T 7/73*         (2017.01)
*G06T 7/13*         (2017.01)
(Continued)

(52) U.S. Cl.
CPC .............. *G06T 7/13* (2017.01); *G06T 7/194* (2017.01); *G06T 7/251* (2017.01); *G06T 7/75* (2017.01);
(Continued)

(58) Field of Classification Search
CPC ........... G06K 9/00369; G06K 9/00342; G06K 9/00362; G06K 9/6215; G06K 2209/05;
(Continued)

(56) References Cited

U.S. PATENT DOCUMENTS 7,257,237 B1 *   8/2007   Luck ..................... A61B 5/1113
                                                          382/103
9,076,023 B2     7/2015   De Jong

FOREIGN PATENT DOCUMENTS

CN        102646245 A        8/2012
CN        102939614 A        2/2013
(Continued)

OTHER PUBLICATIONS

Straka, Human Pose and Shape Estimation from Multi-View Images for Virtual Dressing Rooms, Thesis, Jan. 2014 [retrieved Jan. 30, 2021], Graz University of Technology, 164 pages. Retrieved: https://diglib.tugraz.at/human-pose-and-shape-estimation-from-multi-view-images-for-virtual-dressing-rooms-2014 (Year: 2014).*
(Continued)

*Primary Examiner* — Matthew C Bella
*Assistant Examiner* — Dennis Rosario
(74) *Attorney, Agent, or Firm* — Oblon, McClelland, Maier & Neustadt, L.L.P.

(57) ABSTRACT

The present disclosure discloses a method and a device for acquiring figure parameters of a user. The method includes the following steps: acquiring a photo of the user; processing the photo to generate a profile of the user; taking a parameterized three-dimensional human body model with a pro-
(Continued)

jection profile consistent with the profile of the user as a target parameterized three-dimensional human body model; and taking figure parameters of the target parameterized three-dimensional human body model as figure parameters of the user.

12 Claims, 8 Drawing Sheets

(51) Int. Cl.
*G06T 7/194* (2017.01)
*G06T 7/246* (2017.01)
*G06T 17/00* (2006.01)

(52) U.S. Cl.
CPC .......... *G06T 17/00* (2013.01); *G06T 2200/08* (2013.01); *G06T 2207/30196* (2013.01)

(58) Field of Classification Search
CPC . G06T 2207/30196; G06T 7/75; G06T 17/00; G06T 2200/08; G06F 3/011; H04N 5/23219
See application file for complete search history.

(56) References Cited

FOREIGN PATENT DOCUMENTS

| CN | 103106586 | A | 5/2013 |
| CN | 104679831 | A | 6/2015 |
| CN | 104899919 | A | 9/2015 |
| CN | 105956912 | A | 9/2016 |
| WO | WO 2006/071006 | A1 | 7/2006 |

OTHER PUBLICATIONS

Zakotnik et al. (A posture optimization algorithm for model-based motion capture of movement sequences), May 30, 2004 [retrieved Sep. 10, 2021], Journal of Neuroscience Methods, vol. 135, Issue 1-2, pp. 43-54. Retrieved: https://www.sciencedirect.com/science/article/pii/S0165027003004072 (Year: 2004).*

International Search Report dated Mar. 27, 2018 in PCT/CN2018/071761 filed on Jan. 8, 2018.

Chinese Office Action dated Apr. 30, 2019 in Chinese Patent Application No. 201710045890.1, 7 pages.

* cited by examiner

METHOD AND DEVICE FOR ACQUIRING FIGURE PARAMETERS OF A USER

TECHNICAL FIELD

The present disclosure relates to the field of personalized virtual fitting, and in particular to a method and a device for acquiring figure parameters of a user.

BACKGROUND

In the personalized virtual fitting system, the figure parameters of the user need to be acquired, and the virtual fitting function can be finished only by the accurate figure parameters.

Currently, the following methods are mainly used for acquiring the figure parameters of the user:

1. A method of measuring by a flexible rule, which requires a user to measure his/her personal figure parameters by using the flexible rule, and upload the personal figure parameters to the system.

2. A method of calculating the figure parameters through the user's fitted clothing, which requires the user to provide the genuine fit clothing brand, clothing model and clothing size.

3. A method of measuring by high-tech instruments and equipment, such as infrared scanning, radar wave scanning and the like, which requires a user to go to a designated place and scan and acquire figure parameters by expensive equipment.

SUMMARY

The inventor has realized that the following three related technologies respectively have the following disadvantages:

1) The method of measuring by a flexible rule: the user experience is not good, the user needs to measure the body by using a flexible rule, the professional requirement is high, and a certain proportion of users cannot measure the figure correctly.

2) The method of calculating the figure parameters through the user's fitted clothing: the user needs to have a genuine fit clothing, otherwise the obtained user figure parameters will be inaccurate due to inaccuracies in the size of the clothing itself.

3) The method of measuring by high-tech instruments and equipment: high-tech instruments and equipment are expensive, cannot be owned by an individual user, and the user needs to go to special locations for measurement, so that the cost in terms of traffic and time is high, and the popularization speed is low.

In view of the above technical problems, the present disclosure provides a method and a device for acquiring figure parameters of a user, which can automatically acquire accurate user figure parameters by processing a shot photo of a user.

According to one aspect of the present disclosure, there is provided a method for acquiring figure parameters of a user, comprising: acquiring a photo of the user; processing the photo to generate a profile of the user; taking a parameterized three-dimensional human body model with a projection profile consistent with the profile of the user as a target parameterized three-dimensional human body model; and taking figure parameters of the target parameterized three-dimensional human body model as figure parameters of the user.

In some embodiments of the present disclosure, taking a parameterized three-dimensional human body model with a projection profile consistent with the profile of the user as a target parameterized three-dimensional human body model comprises: acquiring a profile posture of the user and a profile height of the user according to the profile of the user; adjusting a parameterized three-dimensional human body model posture to be consistent with the profile posture of the user; adjusting a parameterized three-dimensional human body model height to be consistent with the profile height of the user; and taking a parameterized three-dimensional human body model with a profile error between the parameterized three-dimensional human body model profile and the profile of the user less than a preset value as a target parameterized three-dimensional human body model.

In some embodiments of the present disclosure, the profile posture of the user comprises an arm unfolding angle and a leg separation angle; acquiring the profile posture of the user according to the profile of the user comprises: acquiring a profile center line of the profile of the user; and acquiring the arm unfolding angle and the leg separation angle according to the profile center line.

In some embodiments of the present disclosure, taking a parameterized three-dimensional human body model with a profile error between the parameterized three-dimensional human body model profile and the profile of the user less than a preset value as a target parameterized three-dimensional human body model comprises: randomly generating N groups of figure parameters, and calculating a profile error between a parameterized three-dimensional human body model profile corresponding to each group of figure parameters and the profile of the user, wherein N is a natural number greater than 2; determining whether a profile error of a group of figure parameters with a minimum profile error is smaller than a preset value; if the profile error of the group of figure parameters with a minimum profile error is smaller than the preset value, taking a parameterized three-dimensional human body model corresponding to the group of figure parameters with a minimum profile error as a target parameterized three-dimensional human body model.

In some embodiments of the present disclosure, taking a parameterized three-dimensional human body model with a profile error between the parameterized three-dimensional human body model profile and the profile of the user less than a preset value as a target parameterized three-dimensional human body model further comprises: if the profile error of the group of figure parameters with a minimum profile error is not smaller than the preset value, determining two groups of figure parameters with minimum profile errors; and combining the two groups of figure parameters with minimum profile errors to generate new N groups of figure parameters, and then executing a step of calculating a profile error between the parameterized three-dimensional human body model profile corresponding to each group of figure parameters and the profile of the user.

In some embodiments of the present disclosure, generating new N groups of figure parameters according to the two groups of figure parameters with minimum profile errors comprises: generating new N groups of figure parameters according to an average value of each parameter in the two groups of figure parameters with minimum profile errors and a random offset value in a preset proportion range.

In some embodiments of the present disclosure, processing the photo to generate a profile of the user comprises: separating a foreground and a background of the human body of the user; generating a binary image according to the foreground and the background of the human body of the user, wherein values of the foreground and the background of the human body of the user are different; and extracting edges of the binary image to generate a profile of the user.

In some embodiments of the present disclosure, separating the foreground and the background of the human body of the user comprises:

receiving foreground identification points and background identification points of the human body input by the user; and separating the foreground from the background of the human body of the user according to the foreground identification points and the background identification points of the human body.

In some embodiments of the present disclosure, after taking a parameterized three-dimensional human body model with a projection profile consistent with the profile of the user as a target parameterized three-dimensional human body model, the method further comprises: measuring figure parameters of the target parameterized three-dimensional human body model, and then executing the step of taking the figure parameters of the target parameterized three-dimensional human body model as the figure parameters of the user.

According to another aspect of the present disclosure, there is provided a device for acquiring figure parameters of a user, including a memory and a processor, wherein: the memory is used for storing instructions; and the processor is used for executing the instructions to cause the device to: acquire a photo of the user; process the photo to generate a profile of the user; take a parameterized three-dimensional human body model with a projection profile consistent with the profile of the user as a target parameterized three-dimensional human body model; and take figure parameters of the target parameterized three-dimensional human body model as figure parameters of the user.

In some embodiments of the present disclosure, wherein taking a parameterized three-dimensional human body model with a projection profile consistent with the profile of the user as a target parameterized three-dimensional human body model comprises: acquiring a profile posture of the user and a profile height of the user according to the profile of the user; adjusting the posture of the parameterized three-dimensional human body model to be consistent with the profile posture of the user; adjusting the height of the parameterized three-dimensional human body model to be consistent with the profile height of the user; and taking a parameterized three-dimensional human body model with a profile error between the parameterized three-dimensional human body model profile and the profile of the user less than a preset value as the target parameterized three-dimensional human body model.

In some embodiments of the present disclosure, wherein the profile posture of the user comprises an arm unfolding angle and a leg separation angle; acquiring the profile posture of the user according to the profile of the user comprises: acquiring a profile center line of the profile of the user; and acquiring the arm unfolding angle and the leg separation angle according to the profile center line.

In some embodiments of the present disclosure, wherein taking a parameterized three-dimensional human body model with a profile error between the parameterized three-dimensional human body model profile and the profile of the user less than a preset value as a target parameterized three-dimensional human body model comprises: randomly generating N groups of figure parameters, and calculating the profile error between the profile of the parameterized three-dimensional human body model corresponding to each group of figure parameters and the profile of the user, wherein N is a natural number greater than 2; determining whether the profile error of a group of figure parameters with a minimum profile error is smaller than the preset value; and in the case where the profile error of the group of figure parameters with the minimum profile error is smaller than the preset value, taking the parameterized three-dimensional human body model corresponding to the group of figure parameters with the minimum profile error as the target parameterized three-dimensional human body model.

In some embodiments of the present disclosure, wherein taking a parameterized three-dimensional human body model with a profile error between the parameterized three-dimensional human body model profile and the profile of the user less than a preset value as a target parameterized three-dimensional human body model further comprises: in the case where the profile error of the group of figure parameters with a minimum profile error is not smaller than the preset value, determining two groups of figure parameters with minimum profile errors; and combining the two groups of figure parameters with minimum profile errors to generate new N groups of figure parameters, and then executing a step of calculating a profile error between the parameterized three-dimensional human body model profile corresponding to each group of figure parameters and the profile of the user.

In some embodiments of the present disclosure, wherein combining the two groups of figure parameters with minimum profile errors to generate new N groups of figure parameters comprises: generating new N groups of figure parameters according to an average value of each parameter in the two groups of figure parameters with minimum profile errors and a random offset value in a preset proportion range.

According to another aspect of the present disclosure, there is provided a computer-readable storage medium, wherein the computer-readable storage medium stores computer instructions that, when executed by a processor, cause the device for acquiring figure parameters of a user to: acquire a photo of the user; process the photo to generate a profile of the user; take a parameterized three-dimensional human body model with a projection profile consistent with the profile of the user as a target parameterized three-dimensional human body model; and take figure parameters of the target parameterized three-dimensional human body model as figure parameters of the user.

In some embodiments of the present disclosure, wherein taking a parameterized three-dimensional human body model with a projection profile consistent with the profile of the user as a target parameterized three-dimensional human body model comprises: acquiring a profile posture of the user and a profile height of the user according to the profile of the user; adjusting the posture of the parameterized three-dimensional human body model to be consistent with the profile posture of the user; adjusting the height of the parameterized three-dimensional human body model to be consistent with the profile height of the user; and taking a parameterized three-dimensional human body model with a profile error between the parameterized three-dimensional human body model profile and the profile of the user less than a preset value as the target parameterized three-dimensional human body model.

In some embodiments of the present disclosure, wherein the profile posture of the user comprises an arm unfolding angle and a leg separation angle; acquiring the profile posture of the user according to the profile of the user comprises: acquiring a profile center line of the profile of the user; and acquiring the arm unfolding angle and the leg separation angle according to the profile center line.

In some embodiments of the present disclosure, wherein taking a parameterized three-dimensional human body model with a profile error between the parameterized three-dimensional human body model profile and the profile of the user less than a preset value as a target parameterized three-dimensional human body model comprises: randomly generating N groups of figure parameters, and calculating the profile error between the profile of the parameterized three-dimensional human body model corresponding to each group of figure parameters and the profile of the user, wherein N is a natural number greater than 2; determining whether the profile error of a group of figure parameters with a minimum profile error is smaller than the preset value; and in the case where the profile error of the group of figure parameters with the minimum profile error is smaller than the preset value, taking the parameterized three-dimensional human body model corresponding to the group of figure parameters with the minimum profile error as the target parameterized three-dimensional human body model.

In some embodiments of the present disclosure, wherein taking a parameterized three-dimensional human body model with a profile error between the parameterized three-dimensional human body model profile and the profile of the user less than a preset value as a target parameterized three-dimensional human body model further comprises: in the case where the profile error of the group of figure parameters with a minimum profile error is not smaller than the preset value, determining two groups of figure parameters with minimum profile errors; and combining the two groups of figure parameters with minimum profile errors to generate new N groups of figure parameters, and then executing a step of calculating a profile error between the parameterized three-dimensional human body model profile corresponding to each group of figure parameters and the profile of the user.

The present disclosure can automatically obtain accurate figure parameters of a user by processing a shot picture of the user; the present disclosure can conveniently acquire the figure parameters of the user, which are very helpful for improving the effect of virtual fitting application.

BRIEF DESCRIPTION OF THE DRAWINGS

In order to more clearly illustrate the embodiments or technical solutions in related technologies of the present disclosure, a brief introduction will be given below for the drawings required to be used in the description of the embodiments or technical solutions in related technologies. It is obvious that, the drawings illustrated as follows are merely some of the embodiments of the present disclosure. For an ordinary skilled in the art, he or she may also acquire other drawings according to such drawings without paying inventive efforts.

DETAILED DESCRIPTION

Figure 1:
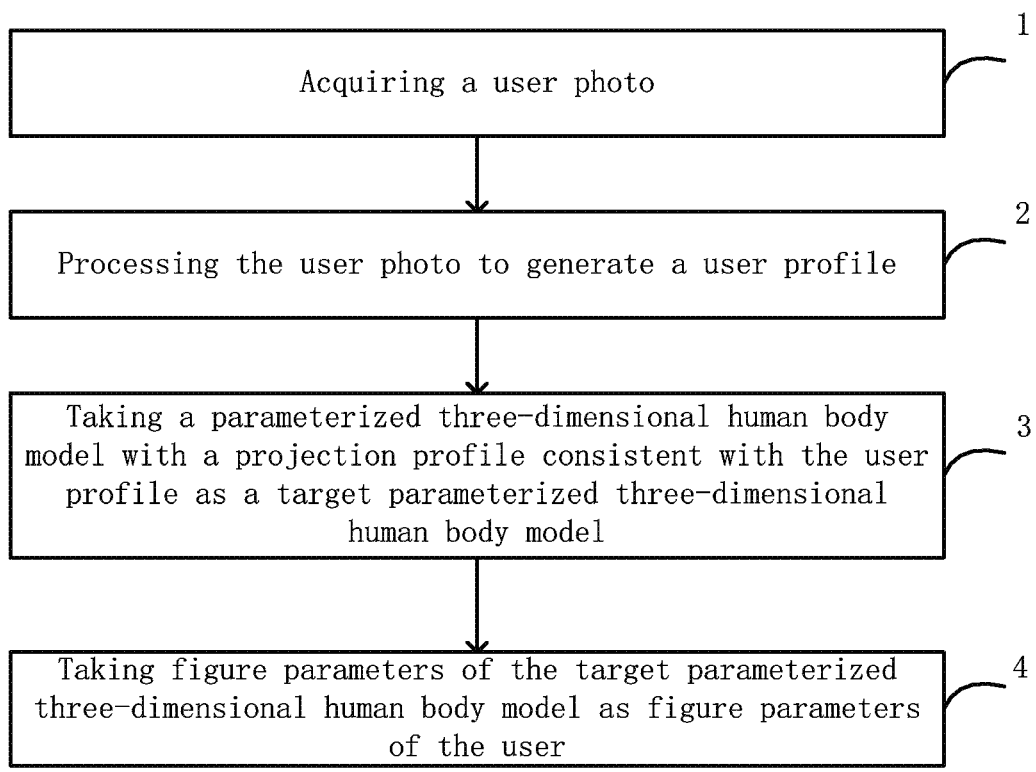
FIG. 1 is a schematic diagram of some embodiments of a method for acquiring figure parameters of a user of the present disclosure.

The technical solutions in the embodiments of the present disclosure will be clearly and completely described below with reference to the accompanying drawings in the embodiments of the present disclosure. Obviously, the described embodiments are only a part of the embodiments of the present disclosure instead of all of them. The following descriptions on at least one illustrative embodiment are actually illustrative, but shall not set any limitation on the present disclosure and its application or utilization. All other embodiments that are obtainable to those skilled in the art based on the embodiments of the present disclosure without any creative effort are included in the protection scope of the present disclosure.

Unless otherwise illustrated, respective arrangements, mathematic expressions and values of the components and steps illustrated in these embodiments do not limit the scope of the present disclosure.

Meanwhile, it shall be understood that in order to facilitate description, the respective parts shown in the drawings are not drawn in sizes according to actual proportional relations.

Techniques, methods and devices that have already been known to ordinary technicians in the art may not be discussed here in detail, but under suitable circumstances, the techniques, methods and devices shall be deemed as parts of the granted description.

In the embodiments shown and discussed here, any specific value shall be interpreted as only illustrative, instead of limitative. Hence, other embodiments of the illustrative embodiments may have different values.

It shall be noted that similar marks and letters represent similar items in the following figures, so once a certain item is defined in one figure, no further discussion on it is required in the following figures.

FIG. 1 is a schematic diagram of some embodiments of a method for acquiring figure parameters of a user of the present disclosure. Optionally, this/her embodiment may be executed by the user figure acquisition device of the present disclosure. As shown in FIG. 1, the method may include the following steps 1 to 4.

In step 1, a user photo is acquired.

In some embodiments of the present disclosure, the user photo may be a whole body photo or a half body photo (in the case of trying on a jacket or pants only).

In some embodiments of the present disclosure, the user photo may be at least one of a front photo, a back photo, or a side photo.

In some embodiments of the present disclosure, after the user takes a photo, the user photo may be uploaded to the device for acquiring figure parameters of a user (server) of the present disclosure for processing.

In some specific embodiments of the present disclosure, step 1 may include: the user only needs to take photos approximately in a designated posture (with the legs slightly separated without overlap, with the arms unfolded without contact the body) in an environment where the background is not very complex and upload it to the server, so that the server extracts profiles of the front and side photos taken by the user and then acquires accurate figure parameters within seconds.

In other embodiments of the present disclosure, the user photo may be automatically acquired by a photographing module of the device for acquiring figure parameters of a user (server) of the present disclosure.

In step 2, the user photo is processed to generate a profile of the user.

In some embodiments of the present disclosure, step 2 may include steps 21 to 23.

In step 21, a foreground is separated from a background of the human body of the user.

In some embodiments of the present disclosure, step 21 may include step 211 and step 212.

In step 211, a number of foreground identification points and a number of background identification points of the human body input by a user are received.

Figure 2:
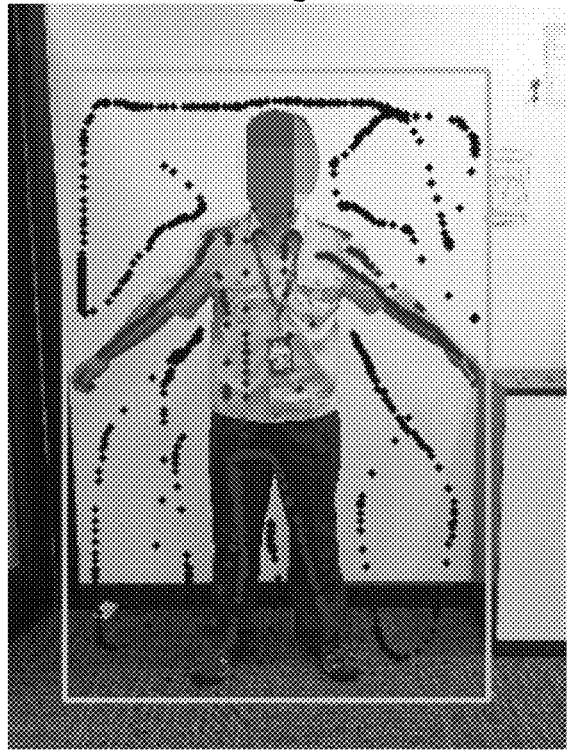
FIG. 2 is a schematic diagram generally specifying foreground and background of a human body in some embodiments of the present disclosure.

In some embodiments, step 211 may include: roughly specifying a foreground region and a background region by roughly manually specifying the foreground and the background (as in FIG. 2, the human body including clothing is roughly the foreground, the box indicates an effective range, and the rest of the box is roughly the background).

Figure 3:
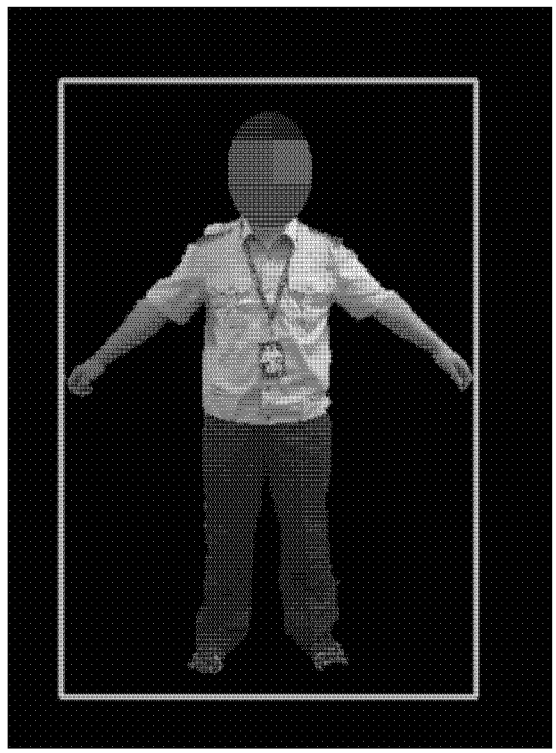
FIG. 3 is a schematic diagram of foreground and background separation in some embodiments of the present disclosure.

In step 212, an algorithm such as GrabCut is used to separate the foreground from the background of the human body of the user according to the foreground identification points and background identification points of the human body, so as to obtain accurate foreground (human body) and background, wherein the GrabCut algorithm can accurately separate the foreground from the background on the premise that the background is not too complex. As shown in FIG. 3, the background is all indicated in black. To protect the privacy of the user, the face in the user photo is blurred in FIG. 2 and FIG. 3.

In step 22, a binary image is generated according to the foreground and the background of the human body of the user, where values of the foreground and the background of the human body of the user are different.

In some embodiments of the present disclosure, the binary image is a black-and-white binary image.

Figure 4:
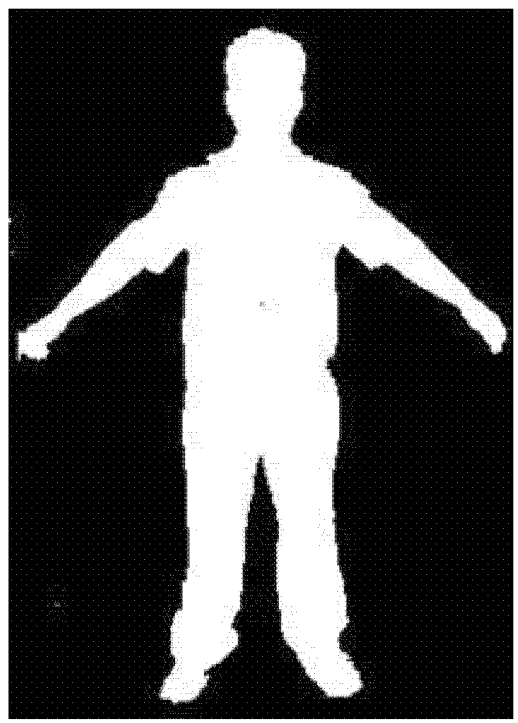
FIG. 4 is a schematic diagram of a black-and-white binary image of a human body in some embodiments of the present disclosure.

In some embodiments of the present disclosure, step 22 may include: generating a black-and-white binary image, in which a portion belonging to the human body is white and a portion belonging to the background is black, as shown in FIG. 4, the portion belonging to the human body (including clothing) is entirely filled with white, and portions other than the box (effective range) shown in FIG. 3 are entirely removed.

Figure 5:
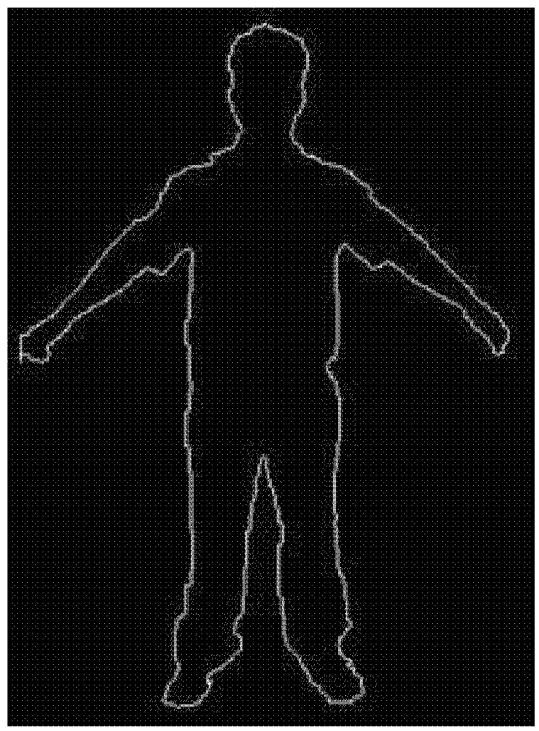
FIG. 5 is a schematic diagram of a profile map of a human body in some embodiments of the present disclosure.

In step 23, edges of the binary image are extracted to generate a profile of the user, as shown in FIG. 5.

Figure 6:
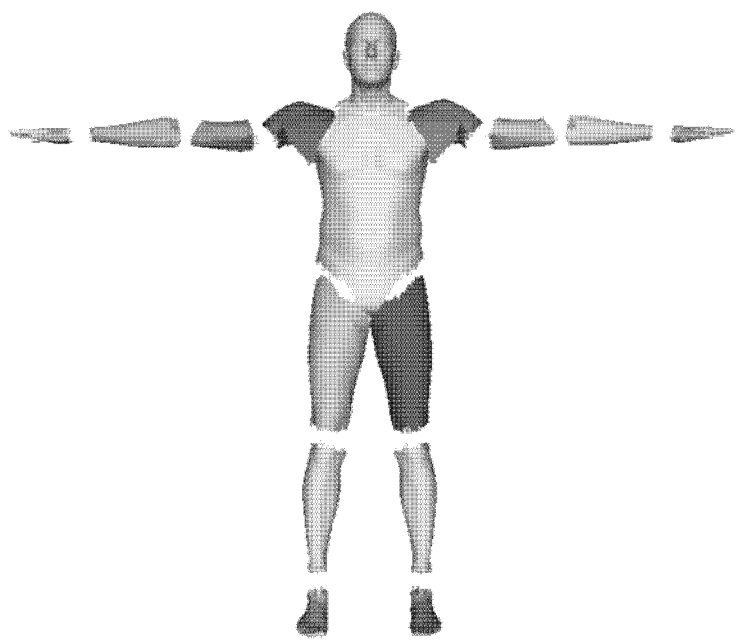
FIG. 6 is a schematic diagram of a parameterized three-dimensional human body model in some embodiments of the present disclosure.

In step 3, after the profile of the user is obtained, the parameterized three-dimensional human body model shown in FIG. 6 is constrained by the profile of the user shown in FIG. 5, and a parameterized three-dimensional human body model with a projection profile consistent with the profile of the user is used as a target parameterized three-dimensional human body model.

In some embodiments of the present disclosure, in the case where the user photo is a front photo, the corresponding projection profile is a front projection profile of the parameterized three-dimensional human body model; in the case where the user photo is a back photo, the corresponding projection profile is a back projection profile of the parameterized three-dimensional human body model; in the case where the user photo is a side photo, the corresponding projection profile is a side projection profile of the parameterized three-dimensional human body model.

In some embodiments of the present disclosure, step 3 may include: using the profile of the user shown in FIG. 5 to check the consistency of the parameterized three-dimensional human body model shown in FIG. 6 and the user figure, if the projection profile of the three-dimensional human body model is consistent with the profile of the user, the three-dimensional human body model is considered to be consistent with the user figure, and therefore the real figure parameters of the user can be obtained only by measuring the figure parameters of the three-dimensional human body model.

As shown in FIG. 6, a parameterized three-dimensional human body model is divided into: trunk, head, left shoulder, right shoulder, left upper arm, right upper arm, left forearm, right forearm, left hand, right hand, left thigh, right thigh, left shank, right shank, left foot, right foot. The size of each part can be adjusted through parameters, and a complete three-dimensional human body model is spliced. Three-dimensional human bodies spliced by different parameters are different in figure, and different figures can be simulated by different parameter combinations.

In some embodiments of the present disclosure, step 3 may include steps 31 to 34.

In step 31, a profile posture of the user and a profile height of the user are obtained according to the profile of the user, wherein the profile posture of the user may include an arm unfolding angle and a leg separation angle.

In some specific embodiments of the present disclosure, step 31 may include step 311 and step 312.

Figure 7:
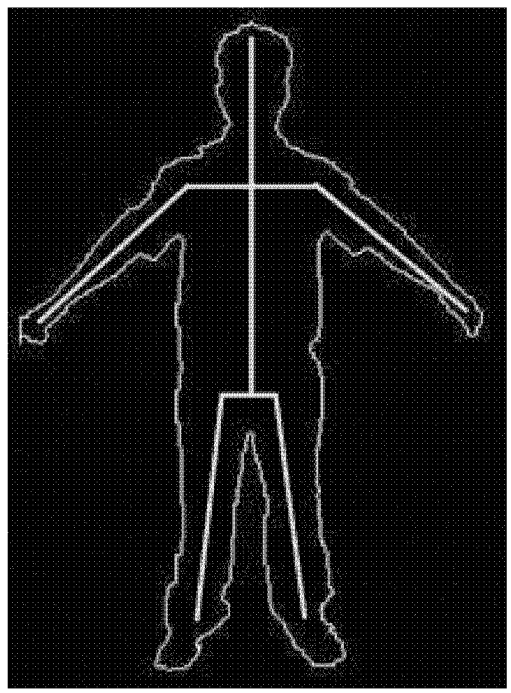
FIG. 7 is a line drawing of a human body posture in some embodiments of the present disclosure.

In step 311, a profile center line of the profile of the user is obtained according to the profile of the user, and a posture of the profile of the user can be represented by the profile center line (the thick line in the middle of the profile map), and the thick line can be located in the center of the profile by a suitable algorithm, as shown in FIG. 7.

In step 312, the arm unfolding angle and the leg separation angle are obtained according to the profile center line.

In step 32, a parameterized three-dimensional human body model posture is adjusted to be consistent with the profile posture of the user.

In some specific embodiments of the present disclosure, step 32 may include: setting an angle of both legs and an angle of both arms to the arm unfolding angle and the leg separation angle acquired in step 31.

Figure 8:
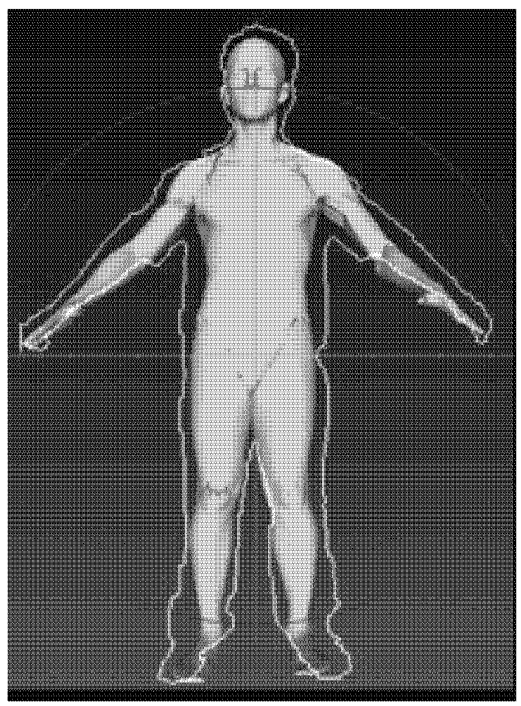
FIG. 8 is a schematic diagram illustrating an adjustment of a parameterized three-dimensional human body model height to be consistent with a profile height of the user in some embodiments of the present disclosure.

In step 33, a parameterized three-dimensional human model height is adjusted to be consistent with the profile height of the user, as shown in FIG. 8.

In step 34, a parameterized three-dimensional human body model with a profile error between the parameterized three-dimensional human body model profile and the profile of the user less than a preset value (e.g., 3%) is taken as a target parameterized three-dimensional human body model.

In step 4, figure parameters of the target parameterized three-dimensional human model are taken as the user figure parameters, wherein the user figure parameters can comprise specific parameters such as height, chest circumference, waist circumference, hip circumference, shoulder width, leg length and the like; the figure parameters of the parameterized three-dimensional human body model may include specific parameters such as height, chest circumference, waist circumference, hip circumference, shoulder width, leg length, and the like.

In some embodiments of the present disclosure, after step 3, the method may further include: measuring figure parameters of the target parameterized three-dimensional human body model, and then executing step 4.

Based on the method for acquiring figure parameters of a user provided by the above-mentioned embodiments of the present disclosure, accurate user figure parameters can be automatically acquired by processing the shot user photo; the present disclosure can conveniently acquire the figure parameters of the user, which are very helpful for improving the effect of virtual fitting application.

Figure 9:
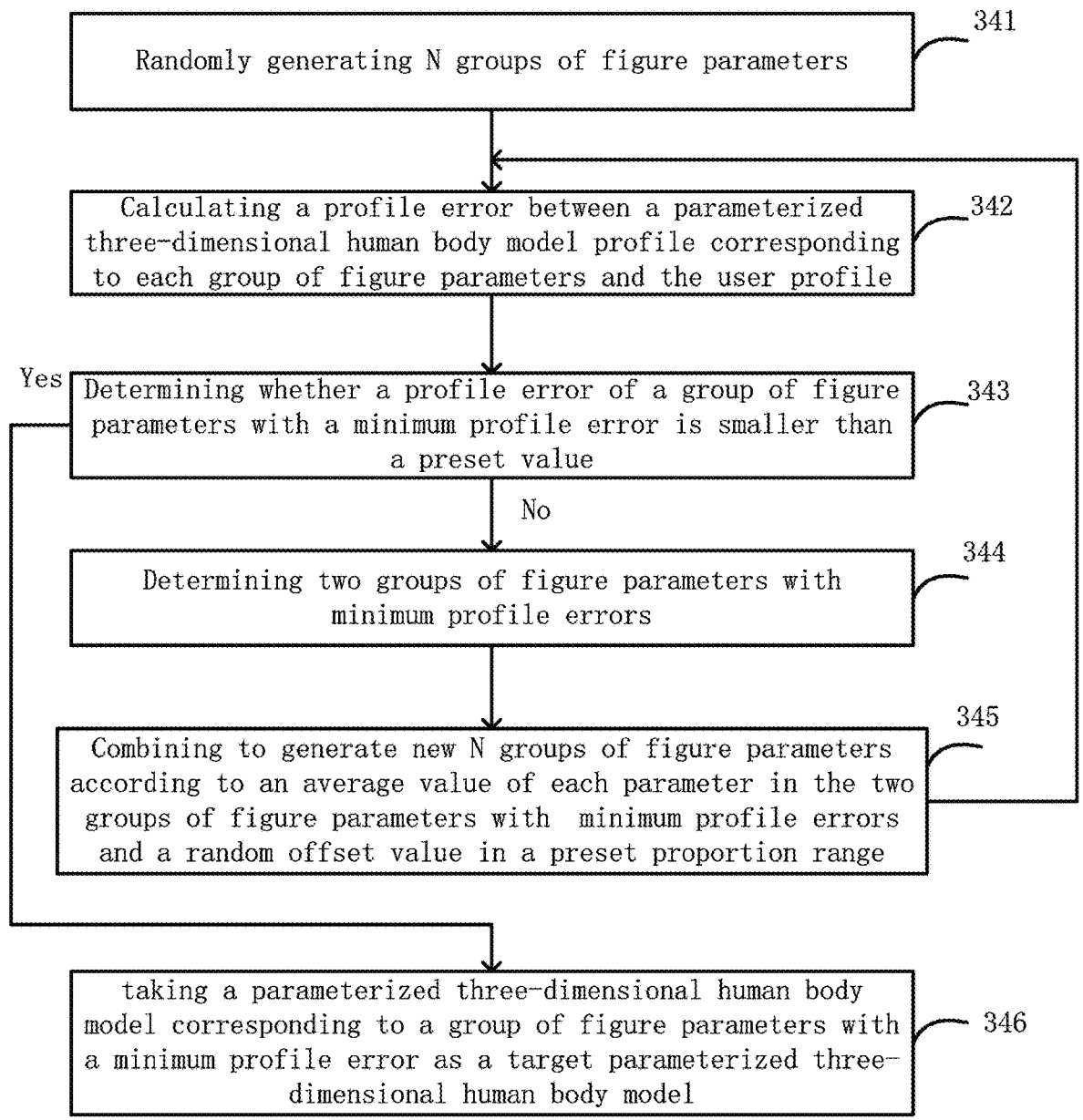
FIG. 9 is a schematic diagram of determining a target parameterized three-dimensional human body model in some embodiments of the present disclosure.

FIG. 9 is a schematic diagram of determining a target parameterized three-dimensional human body model in some embodiments of the present disclosure. As shown in FIG. 9, the step (i.e., step 34) of taking a parameterized three-dimensional human body model with a profile error between the parameterized three-dimensional human body model profile and the profile of the user less than a preset value as a target parameterized three-dimensional human body model may include step 341 to step 346.

In step 341, N groups of figure parameters are randomly generated, wherein N is a natural number larger than 2.

In step 342, a profile error between a parameterized three-dimensional human body model profile corresponding to each group of figure parameters and the profile of the user is calculated.

In some embodiments of the present disclosure, step 342 may include: comparing pixel errors between the profile of the user and the three-dimensional human model profile in a horizontal direction on a pixel-by-pixel basis in the vertical direction of the picture, in a manner of, for example, obtaining Euclidean distance, in the picture as shown in FIG. 8, to sum up the errors.

In step 343, it is determined whether a profile error of a group of figure parameters with a minimum profile error is smaller than a preset value. If the profile error of the group of figure parameters with a minimum profile error is smaller than the preset value, a target model determination submodule is instructed to execute step 346; otherwise, if the profile error of the group of figure parameters with a minimum profile error is not less than the preset value, a figure parameter group selection submodule is instructed to execute step 344.

In step 344, two groups of figure parameters with minimum profile errors are determined.

In step 345, new N groups of figure parameters are generated according to the two groups of figure parameter with a minimum profile error, and then the profile error acquisition submodule is instructed to execute step 342.

In some embodiments of the present disclosure, step 345 may include: generating new N groups of figure parameters according to an average value of each parameter in the two groups of figure parameters with minimum profile errors and a random offset value in a preset proportion range.

In some specific embodiments of the present disclosure, step 345 may include: acquiring new N groups of figure parameters according to formula (1).

$$N=((A+B)/2) \times R \tag{1}$$

where N is a new figure parameter, A and B are two groups of figure parameters with minimum errors, respectively, and R is a random offset value between [0.9~1.1].

In step 346, a parameterized three-dimensional human body model corresponding to the group of figure parameters with a minimum profile error is used as a target parameterized three-dimensional human body model.

The above-mentioned embodiments of the present disclosure can find out the two groups with minimum errors by trying N groups (for example, 10 groups) of random figure parameters and calculating the profile error, then combine the two groups of figure parameters, namely take an average number of each parameter of the two groups of figure parameters and add plus-or-minus 10 percent random offset to combine into new N groups of different figure parameters, wherein each new figure parameter is obtained by using the formula 1, and find out two groups of figure parameters with minimum profile errors again, and repeat the steps to reduce an error between a profile of the three-dimensional human body model and a profile of the user photo until the error is smaller than a target value (such as 3 percent), thereby obtaining the figure parameters of the user.

The method of determining a target parameterized three-dimensional human body model in the embodiment of FIG. 9 is described in detail below by means of some specific embodiments.

In the first step, 10 groups of figure parameters are randomly generated, as shown in table 1. Each parameter has a preset minimum value and a preset maximum value, the randomly generated figure parameters should be between the minimum value and the maximum value, for example, a minimum value of the shoulder width is 32, and a maximum value is 48, and the randomly generated shoulder width is between 32 and 48 (the minimum value and the maximum value can be adjusted according to different application occasions, for example, the range between the minimum value and the maximum value can be reduced if the gender and age of a user are known, so that the randomly generated figure parameters are closer to true values).

TABLE 1

| Serial number | Shoulder width | Chest circumference | Waist circumference | Hip circumference | Arm length | Arm circumference | Leg length | Leg circumference | Error |
|---|---|---|---|---|---|---|---|---|---|
| 1 | 40 | 92 | 85 | 98 | 61 | 31 | 101 | 50 | 26% |
| 2 | 41 | 98 | 87 | 102 | 58 | 29 | 99 | 48 | 33% |

TABLE 1-continued

| Serial number | Shoulder width | Chest circumference | Waist circumference | Hip circumference | Arm length | Arm circumference | Leg length | Leg circumference | Error |
|---|---|---|---|---|---|---|---|---|---|
| 3 | 42 | 95 | 93 | 91 | 63 | 28 | 105 | 47 | 29% |
| 4 | 40 | 99 | 99 | 88 | 67 | 33 | 93 | 52 | 34% |
| 5 | 39 | 87 | 105 | 103 | 56 | 34 | 96 | 55 | 41% |
| 6 | 37 | 86 | 81 | 99 | 55 | 35 | 88 | 49 | 39% |
| 7 | 44 | 105 | 82 | 87 | 61 | 27 | 95 | 53 | 43% |
| 8 | 38 | 78 | 92 | 89 | 62 | 34 | 108 | 54 | 39% |
| 9 | 42 | 81 | 98 | 93 | 57 | 31 | 111 | 55 | 45% |
| 10 | 40 | 98 | 101 | 97 | 64 | 28 | 92 | 57 | 38% |

Step 2, calculate the errors of each group. It can be seen that the first group of figure parameters and the third group of figure parameters have the smallest error, and an average number of the first group of figure parameters and the third group of figure parameters is taken to add plus-or-minus 10 percent random offset to form new 10 groups of figure parameters.

For example, new shoulder width parameters are: ((40+42)/2×[0.9~1.1]=[36.9~45.1], namely, the new shoulder width is a random number between 36.9~45.1. 10 new shoulder width parameters are obtained by taking 10 random numbers, the generation methods of other figure parameters are analogized, 10 groups of figure parameters can be obtained, then a profile error is calculated, two groups with minimum errors are selected, and 10 groups of new figure parameters are generated according to the above method. The error can be gradually reduced by repeating the steps, and a result with a small error is picked out.

Figure 10:
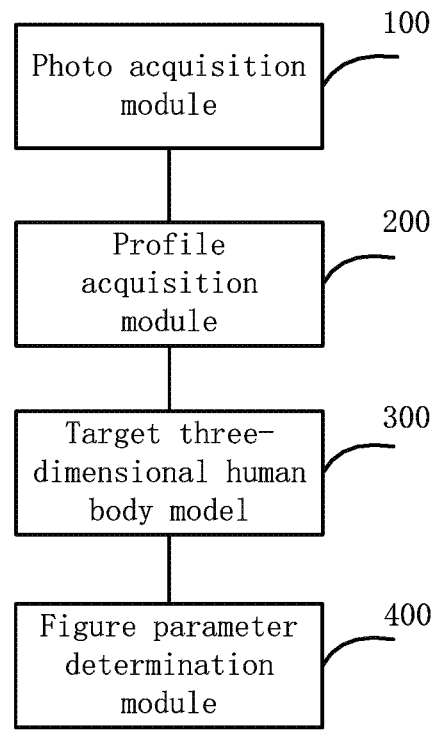
FIG. 10 is a schematic diagram of some embodiments of a profile of the user parameter acquisition device of the present disclosure.

FIG. 10 is a schematic diagram of some embodiments of a profile of the user parameter acquisition device of the present disclosure. As shown in FIG. 10, the illustrated device for acquiring figure parameters of a user may include a photo acquisition module 100, a profile acquisition module 200, a target three-dimensional model determination module 300, and a figure parameter determination module 400.

The photo acquisition module 100 is used for acquiring a photo of the user.

The profile acquisition module 200 is used for processing the photo to generate a profile of the user.

The target three-dimensional model determination module 300 is used for taking a parameterized three-dimensional human body model with a projection profile consistent with the profile of the user as a target parameterized three-dimensional human body model.

The figure parameter determination module 400 is used for taking the figure parameters of the target parameterized three-dimensional human body model as the figure parameters of the user.

Based on the device for acquiring figure parameters of a user provided by the above-mentioned embodiments of the present disclosure, accurate user figure parameters can be automatically acquired by processing the shot user photo; the present disclosure can conveniently acquire the figure parameters of the user, which are very helpful for improving the effect of virtual fitting application.

Figure 11:
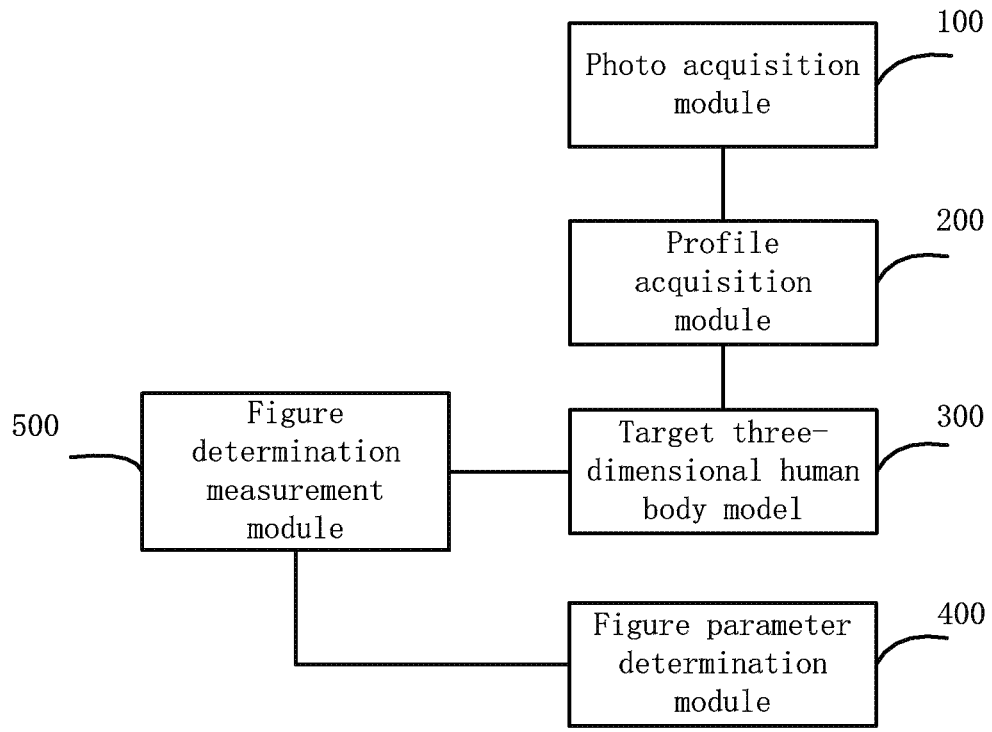
FIG. 11 is a schematic diagram of further embodiments of the profile of the user parameter acquisition device of the present disclosure.

FIG. 11 is a schematic diagram of further embodiments of the profile of the user parameter acquisition device of the present disclosure. In contrast to the embodiments as shown in FIG. 10, in the embodiments as shown in FIG. 11, the device may further comprise a figure parameter measurement module 500, wherein:

The figure parameter measurement module 500 is used for, after the target three-dimensional model determination module 300 takes a parameterized three-dimensional human body model with a front projection profile consistent with the profile of the user as a target parameterized three-dimensional human body model, measuring figure parameters of the target parameterized three-dimensional human body model, and then instructing the figure parameter determination module 400 to execute the operation of taking figure parameters of the target parameterized three-dimensional human body model as figure parameters of the user.

Figure 12:
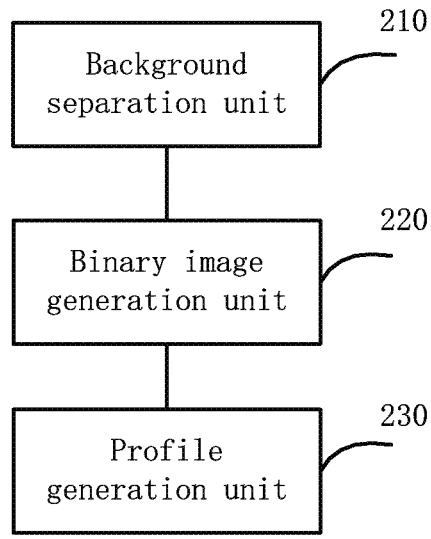
FIG. 12 is a schematic diagram of a profile acquisition module in some embodiments of the present disclosure.

FIG. 12 is a schematic diagram of a profile acquisition module in some embodiments of the present disclosure. As shown in FIG. 12, the profile acquisition module 200 shown in the embodiments of FIG. 10 or FIG. 11 may include a background separation unit 210, a binary image generation unit 220, and a profile generation unit 230.

The background separation unit 210 is used for separating a foreground from a background of the human body of a user.

In some embodiments of the present disclosure, the background separation unit 210 may be used for receiving foreground identification points and background identification points of the human body input by the user, and separating the foreground and the background of the human body of the user according to the foreground identification points and the background identification points of the human body.

The binary image generation unit 220 is used for generating a binary image according to the foreground and the background of the human body of the user, wherein values of the foreground and the background of the human body of the user are different.

The profile generation unit 230 is used for extracting edges of the binary image to generate a profile of the user.

Figure 13:
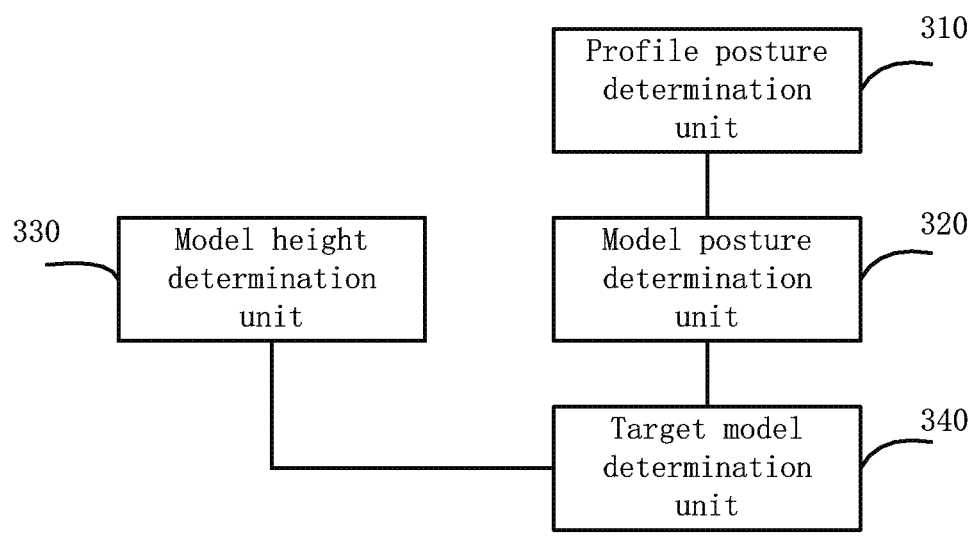
FIG. 13 is a schematic diagram of a target three-dimensional model determination module in some embodiments of the present disclosure.

FIG. 13 is a schematic diagram of a target three-dimensional model determination module in some embodiments of the present disclosure. As shown in FIG. 13, the target three-dimensional model determination module 300 shown in the embodiments of FIG. 10 or FIG. 11 may include a profile posture determination unit 310, a model posture determination unit 320, a model height determination unit 330, and a target model determination unit 340.

The profile posture determination unit 310 is used for obtaining a profile posture of the user and a profile height of the user according to the profile of the user, wherein the profile posture of the user may include an arm unfolding angle and a leg separation angle.

In some embodiments of the present disclosure, the profile posture determination unit 310 is used for acquiring a profile center line of the profile of the user, and acquiring the arm unfolding angle and the leg separation angle according to the profile center line.

The model posture determination unit 320 is used for adjusting a parameterized three-dimensional human model posture to be consistent with the profile posture of the user.

The model height determination unit 330 is used for adjusting a parameterized three-dimensional human model height to be consistent with the profile height of the user.

The target model determination unit 340 is used for taking a parameterized three-dimensional human body model with a profile error between the parameterized three-dimensional human body model profile and the profile of the user less than a preset value as a target parameterized three-dimensional human body model.

Figure 14:
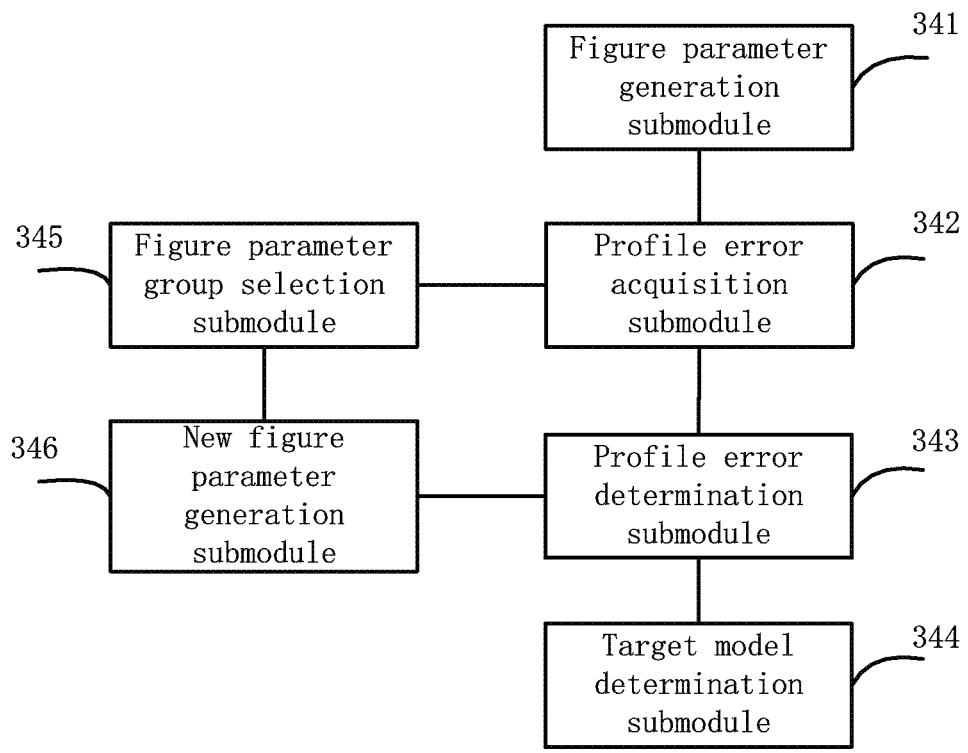
FIG. 14 is a schematic diagram of a target model determination unit in some embodiments of the present disclosure.

FIG. 14 is a schematic diagram of a target model determination unit in some embodiments of the present disclosure. As shown in FIG. 14, the target model determination unit 340 in the embodiment of FIG. 13 may include a figure parameter generation submodule 341, a profile error acquisition submodule 342, a profile error determination submodule 343, and a target model determination submodule 344.

The figure parameter generation submodule 341 is used for randomly generating N groups of figure parameters, wherein N is a natural number larger than 2.

The profile error acquisition submodule 342 is used for calculating a profile error between the parameterized three-dimensional human body model profile corresponding to each group of figure parameters and the profile of the user.

The profile error determination submodule 343 is used for determining whether a profile error of a group of figure parameters with a minimum profile error is smaller than a preset value.

The target model determination submodule 344 is used for taking a parameterized three-dimensional human body model corresponding to the group of figure parameters with a minimum profile error as a target parameterized three-dimensional human body model according to the determination result of the profile error determination submodule under the condition that the profile error of the group of figure parameters with a minimum profile error is less than a preset value.

In some embodiments of the present disclosure, as shown in FIG. 14, the target model determination unit 340 further includes a figure parameter group selection submodule 345 and a new figure parameter generation submodule 346.

The figure parameter group selection submodule 345 is used for determining two groups of figure parameters with minimum profile errors according to a determination result of the profile error determination submodule under the condition that the profile error of the group of figure parameters with a minimum profile error is not less than a preset value.

The new figure parameter generation submodule 346 is used for combining the two groups of figure parameters with minimum profile errors to generate new N groups of figure parameters, and then instructing the profile error acquisition submodule 342 to execute the operation of calculating a profile error between a parameterized three-dimensional human body model profile corresponding to each group of figure parameters and the profile of the user.

In some embodiments of the present disclosure, the new figure parameter generation submodule 346 is used for generating new N groups of figure parameters according to an average value of each parameter in the two groups of figure parameters with minimum profile errors and a random offset value in a preset proportion range.

In some specific embodiments of the present disclosure, the new figure parameter generation submodule 346 may be used to generate new N groups of figure parameters according to the formula (1).

The above-mentioned embodiments of the present disclosure can find out the two groups with minimum errors by trying N groups (for example, 10 groups) of random figure parameters and calculating the profile error, then combine the two groups of figure parameters, namely take an average number of each parameter of the two groups of figure parameters and add plus-or-minus 10 percent random offset to combine into new N groups of different figure parameters, wherein each new figure parameter is obtained by taking the formula 1, and find out two groups of figure parameters with minimum profile errors again, and repeat the steps to reduce an error between a profile of the three-dimensional human body model and a profile of the user photo until the error is smaller than a target value (such as 3 percent), thereby obtaining the figure parameters of the user.

Figure 15:
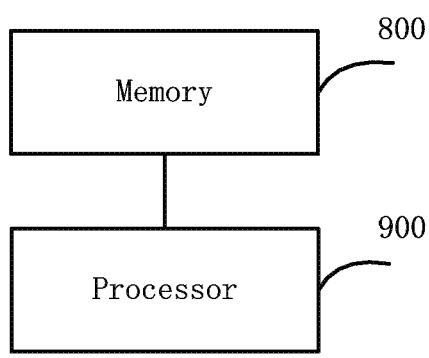
FIG. 15 is a schematic diagram of still further embodiments of the device for acquiring figure parameters of a user of the present disclosure.

FIG. 15 is a schematic diagram of still further embodiments of the device for acquiring figure parameters of a user of the present disclosure. As shown in FIG. 15, the device for acquiring figure parameters of a user may include a memory 800 and a processor 900.

The memory 800 is used for storing instructions.

The processor 900 is used for executing the instructions to cause the device to perform operations to implement the method for acquiring figure parameters of a user as described in any of the above embodiments.

Based on the device for acquiring figure parameters of a user provided by the above-mentioned embodiments of the present disclosure, accurate user figure parameters can be automatically acquired by processing the shot user photo; the present disclosure can conveniently acquire the figure parameters of the user, which are very helpful for improving the effect of virtual fitting application.

In some embodiments of the present invention, there is provided a computer-readable storage medium having stored thereon a computer program that, when executed by a processor, implements the commodity data processing method in any one of the above embodiments. For example, the computer-readable storage medium is a non-transitory computer-readable storage medium.

The profile of the user parameter acquisition device described above may be implemented as a universal processor, a programmable logic controller (PLC), a digital signal processor (DSP), an application-specific integrated circuit (ASIC), a field programmable gate array (FPGA) or other programmable logic devices, discrete gates or transistor logic devices, discrete hardware components or any other suitable combinations thereof which are used for executing the functions as described in the present application.

Heretofore, the present disclosure has been described in details. In order to avoid shielding of the concept of the present disclosure, some details commonly known in the art are not described. Based on the above description, those skilled in the art can fully understand how to carry out the technical solutions disclosed here.

Ordinary skilled in the art may understand that all or part of the steps for implementing the above examples may be performed with hardware or by a program instructing corresponding hardware, wherein the program may be stored on a computer-readable storage medium, which may be a read-only memory, a disc or a compact disc.

The description of the present disclosure is given for illustration and recitation, instead of exhaustive or limiting the present disclosure to the form disclosed. Many modifications and variations are obvious to ordinary technicians in the art. Selection and description in the embodiments are to better illustrate principles and actual applications of the present disclosure and enable ordinary skilled to understand the present disclosure so as to design various embodiments with various modifications suitable for specific usages.

What is claimed is:

1. A method for acquiring figure parameters of a user, comprising:

acquiring a photo of the user;

processing the photo to generate a profile of the user;

taking a parameterized three-dimensional human body model with a projection profile consistent with the profile of the user as a target parameterized three-dimensional human body model, from a plurality of parameterized three-dimensional human body models; and taking figure parameters of the target parameterized three-dimensional human body model as figure parameters of the user, wherein:

the figure parameters comprise at least one figure boundary of a height, a chest circumference, a waist circumference, a hip circumference, a shoulder width and a leg length; and wherein:

the taking a parameterized three-dimensional human body model with a projection profile consistent with the profile of the user as a target parameterized three-dimensional human body model further comprises:

acquiring a profile posture of the user and a profile height of the user according to the profile of the user;

acquiring the plurality of parameterized three-dimensional human body models;

adjusting the posture of each of the plurality of parameterized three-dimensional human body models to be consistent with the profile posture of the user;

adjusting the height of each of the plurality of parameterized three-dimensional human body models to be consistent with the profile height of the user; and acquiring the projection profile of each of the plurality of parameterized three-dimensional human body models, calculating a profile error between the profile of the user and the projection profile of each of the plurality of parameterized three-dimensional human body models, by comparing the profile of the user with the projection profile of each of the plurality of parameterized three-dimensional human body models, and taking the parameterized three-dimensional human body model with the profile error between the profile of the user and the projection profile of each of the plurality of parameterized three-dimensional human body models less than a preset value as the target parameterized three-dimensional human body model, from the plurality of parameterized three-dimensional human body models, wherein:

the acquiring the plurality of parameterized three-dimensional human body models further comprises:

randomly generating N groups of figure parameters, to acquire N parameterized three-dimensional human body models;

acquiring the projection profile of each of the plurality of N parameterized three-dimensional human body models, and calculating a profile error between the profile of the user and the projection profile of each of the plurality of N parameterized three-dimensional human body models, and the taking the parameterized three-dimensional human body model with the profile error less than a preset value as the target parameterized three-dimensional human body model further comprises:

acquiring the projection profile of each of N parameterized three-dimensional human body models and calculating the profile error between the projection profile of the parameterized three-dimensional human body model corresponding to each group of N figure parameters and the profile of the user by comparing the projection profile of the parameterized three-dimensional human body model corresponding to each group of N figure parameters with the profile of the user, wherein N is a natural number greater than 2;

determining that the profile error of a group of N figure parameters with a minimum profile error is not smaller than the preset value;

determining two groups of figure parameters with minimum profile errors;

combining the two groups of figure parameters with minimum profile errors to generate new N groups of figure parameters;

acquiring the projection profile of each of N parameterized three-dimensional human body models and calculating the profile error between the projection profile of the parameterized three-dimensional human body model corresponding to each group of N figure parameters and the profile of the user by comparing the projection profile of the parameterized three-dimensional human body model corresponding to each group of N figure parameters with the profile of the user; and determining the profile error of a group of N figure parameters with a minimum profile error is smaller than the preset value.

2. The method of claim 1, wherein the profile posture of the user comprises an arm unfolding angle and a leg separation angle;

acquiring the profile posture of the user according to the profile of the user comprises:

acquiring a profile center line of the profile of the user; and acquiring the arm unfolding angle and the leg separation angle according to the profile center line.

3. The method of claim 1, wherein combining the two groups of figure parameters with minimum profile errors to generate new N groups of figure parameters comprises:

generating new N groups of figure parameters according to an average value of each parameter in the two groups of figure parameters with minimum profile errors and a random offset value in a preset proportion range, wherein generating new N groups of figure parameters according to an average value of each parameter in the two groups of figure parameters with minimum profile errors and a random offset value in a preset proportion range comprises:

taking an average value of each parameter in the two groups of figure parameters with minimum profile errors; and adding N random offset values in a preset proportion range to the average value of each parameter in the two groups of figure parameters with minimum profile errors, to generate new N groups of figure parameters.

4. The method of claim 1, wherein processing the photo to generate a profile of the user comprises:

separating a foreground from a background of the human body of the user;

generating a binary image according to the foreground and the background of the human body of the user, wherein values of the foreground and the background of the human body of the user are different; and extracting edges of the binary image to generate a profile of the user.

5. The method of claim 4, wherein separating the foreground from the background of the human body of the user comprises:
receiving foreground identification points and background identification points of the human body input by the user; and
separating the foreground from the background of the human body of the user according to the foreground identification points and the background identification points of the human body.

6. The method of claim 1, wherein after taking a parameterized three-dimensional human body model with a projection profile consistent with the profile of the user as a target parameterized three-dimensional human body model, the method further comprises:
measuring figure parameters of the target parameterized three-dimensional human body model.

7. A device including: a memory, configured to store instructions; and
a processor, configured to execute the instructions, so that the device performs operations for implementing a method for acquiring figure parameters of a user, comprising:
acquiring a photo of the user;
processing the photo to generate a profile of the user;
taking a parameterized three-dimensional human body model with a projection profile consistent with the profile of the user as a target parameterized three-dimensional human body model from a plurality of parameterized three-dimensional human body models; and
taking figure parameters of the target parameterized three-dimensional human body model as figure parameters of the user, wherein:
the figure parameters comprise at least one figure boundary of a height, a chest circumference, a waist circumference, a hip circumference, a shoulder width and a leg length; and
taking a parameterized three-dimensional human body model with a projection profile consistent with the profile of the user as a target parameterized three-dimensional human body model comprises:
acquiring a profile posture of the user and a profile height of the user according to the profile of the user;
acquiring the plurality of parameterized three-dimensional human body models;
adjusting the posture of each of the plurality of parameterized three-dimensional human body models to be consistent with the profile posture of the user;
adjusting the height of each of the plurality of parameterized three-dimensional human body models to be consistent with the profile height of the user; and
acquiring the projection profile of each of the plurality of parameterized three-dimensional human body models, calculating a profile error between the profile of the user and the projection profile of each of the plurality of parameterized three-dimensional human body models, by comparing the profile of the user with the projection profile of each of the plurality of parameterized three-dimensional human body models, and taking the parameterized three-dimensional human body model with the profile error less than a preset value as the target parameterized three-dimensional human body model, wherein:
acquiring the plurality of parameterized three-dimensional human body models comprises:
randomly generating N groups of figure parameters, to acquire N parameterized three-dimensional human body models; and
acquiring the projection profile of each of the plurality of parameterized three-dimensional human body models, calculating a profile error between the profile of the user and the projection profile of each of the plurality of parameterized three-dimensional human body models, and taking the parameterized three-dimensional human body model with the profile error less than a preset value as the target parameterized three-dimensional human body model comprises:
acquiring the projection profile of each of N parameterized three-dimensional human body models and calculating the profile error between the projection profile of the parameterized three-dimensional human body model corresponding to each group of figure parameters and the profile of the user by comparing the projection profile of the parameterized three-dimensional human body model corresponding to each group of figure parameters with the profile of the user, wherein N is a natural number greater than 2;
determining whether or not the profile error of a group of figure parameters with a minimum profile error is smaller than the preset value;
taking the parameterized three-dimensional human body model corresponding to the group of figure parameters with the minimum profile error as the target parameterized three-dimensional human body model, in the condition that the profile error of the group of figure parameters with the minimum profile error is smaller than the preset value;
determining two groups of figure parameters with minimum profile errors in the condition that the profile error of the group of figure parameters with the minimum profile error is not smaller than the preset value; and
combining the two groups of figure parameters with minimum profile errors to generate new N groups of figure parameters, and then repeatedly executing the steps of:
1) acquiring the projection profile of each of N parameterized three-dimensional human body models and calculating the profile error between the projection profile of the parameterized three-dimensional human body model corresponding to each group of figure parameters and the profile of the user by comparing the projection profile of the parameterized three-dimensional human body model corresponding to each group of figure parameters with the profile of the user, and
2) determining whether or not the profile error of a group of figure parameters with a minimum profile error is smaller than the preset value.

8. The device of claim 7, wherein the profile posture of the user comprises an arm unfolding angle and a leg separation angle;
acquiring the profile posture of the user according to the profile of the user comprises:
acquiring a profile center line of the profile of the user; and
acquiring the arm unfolding angle and the leg separation angle according to the profile center line.

9. The device of claim 7, wherein combining the two groups of figure parameters with minimum profile errors to generate new N groups of figure parameters comprises:

generating new N groups of figure parameters according to an average value of each parameter in the two groups of figure parameters with minimum profile errors and a random offset value in a preset proportion range, wherein generating new N groups of figure parameters according to an average value of each parameter in the two groups of figure parameters with minimum profile errors and a random offset value in a preset proportion range comprises:

taking an average value of each parameter in the two groups of figure parameters with minimum profile errors; and adding N random offset values in a preset proportion range to the average value of each parameter in the two groups of figure parameters with minimum profile errors, to generate new N groups of figure parameters.

10. A computer-readable storage medium, wherein the computer-readable storage medium stores computer instructions that, when executed by a processor, implement a method for acquiring figure parameters of a user comprising:

acquiring a photo of the user;

processing the photo to generate a profile of the user;

taking a parameterized three-dimensional human body model with a projection profile consistent with the profile of the user as a target parameterized three-dimensional human body model, from a plurality of parameterized three-dimensional human body models; and taking figure parameters of the target parameterized three-dimensional human body model as figure parameters of the user, wherein:

the figure parameters comprise at least one figure boundary of a height, a chest circumference, a waist circumference, a hip circumference, a shoulder width and a leg length; and taking a parameterized three-dimensional human body model with a projection profile consistent with the profile of the user as a target parameterized three-dimensional human body model comprises:

acquiring a profile posture of the user and a profile height of the user according to the profile of the user;

acquiring the plurality of parameterized three-dimensional human body models;

adjusting the posture of each of the plurality of parameterized three-dimensional human body models to be consistent with the profile posture of the user;

adjusting the height of each of the plurality of parameterized three-dimensional human body models to be consistent with the profile height of the user; and acquiring the projection profile of each of the plurality of parameterized three-dimensional human body models, calculating a profile error between the profile of the user and the projection profile of each of the plurality of parameterized three-dimensional human body models, by comparing the profile of the user with the projection profile of each of the plurality of parameterized three-dimensional human body models, and taking the parameterized three-dimensional human body model with the profile error less than a preset value as the target parameterized three-dimensional human body model, wherein:

acquiring the plurality of parameterized three-dimensional human body models comprises:

randomly generating N groups of figure parameters, to acquire N parameterized three-dimensional human body models; and acquiring the projection profile of each of the plurality of parameterized three-dimensional human body models, calculating a profile error between the profile of the user and the projection profile of each of the plurality of parameterized three-dimensional human body models, and taking the parameterized three-dimensional human body model with the profile error less than a preset value as the target parameterized three-dimensional human body model comprises:

acquiring the projection profile of each of N parameterized three-dimensional human body models and calculating the profile error between the projection profile of the parameterized three-dimensional human body model corresponding to each group of figure parameters and the profile of the user by comparing the projection profile of the parameterized three-dimensional human body model corresponding to each group of figure parameters with the profile of the user, wherein N is a natural number greater than 2;

determining whether or not the profile error of a group of figure parameters with a minimum profile error is smaller than the preset value;

taking the parameterized three-dimensional human body model corresponding to the group of figure parameters with the minimum profile error as the target parameterized three-dimensional human body model, in the condition that the profile error of the group of figure parameters with the minimum profile error is smaller than the preset value;

determining two groups of figure parameters with minimum profile errors in the condition that the profile error of the group of figure parameters with the minimum profile error is not smaller than the preset value; and combining the two groups of figure parameters with minimum profile errors to generate new N groups of figure parameters, and then repeatedly executing the steps of:

1) acquiring the projection profile of each of N parameterized three-dimensional human body models and calculating the profile error between the projection profile of the parameterized three-dimensional human body model corresponding to each group of figure parameters and the profile of the user by comparing the projection profile of the parameterized three-dimensional human body model corresponding to each group of figure parameters with the profile of the user, and 2) determining whether or not the profile error of a group of figure parameters with a minimum profile error is smaller than the preset value.

11. The computer-readable storage medium of claim 10, wherein the profile posture of the user comprises an arm unfolding angle and a leg separation angle;

acquiring the profile posture of the user according to the profile of the user comprises:

acquiring a profile center line of the profile of the user; and acquiring the arm unfolding angle and the leg separation angle according to the profile center line.

12. The computer-readable storage medium of claim 10, wherein combining the two groups of figure parameters with minimum profile errors to generate new N groups of figure parameters comprises:

generating new N groups of figure parameters according to an average value of each parameter in the two groups of figure parameters with minimum profile errors and a random offset value in a preset proportion range, wherein generating new N groups of figure parameters according to an average value of each parameter in the two groups of figure parameters with minimum profile errors and a random offset value in a preset proportion range comprises:
taking an average value of each parameter in the two groups of figure parameters with minimum profile errors; and
adding N random offset values in a preset proportion range to the average value of each parameter in the two groups of figure parameters with minimum profile errors, to generate new N groups of figure parameters.

* * * * *